United States Patent [19]

Maienschein et al.

[11] Patent Number: 5,026,670
[45] Date of Patent: Jun. 25, 1991

[54] LOW DENSITY METAL HYDRIDE FOAMS

[75] Inventors: Jon L. Maienschein, Oakland; Patrick E. Barry, Pleasant Hill, both of Calif.

[73] Assignee: The United States of America as represented by the United States Department of Energy, Washington, D.C.

[21] Appl. No.: 531,363

[22] Filed: May 31, 1990

[51] Int. Cl.$^5$ .................. C01B 6/04; C04B 38/00
[52] U.S. Cl. ...................................... 501/80; 423/646
[58] Field of Search ......................... 423/646; 501/80

[56] References Cited

U.S. PATENT DOCUMENTS

| | | | |
|---|---|---|---|
| 2,983,597 | 3/1956 | Elliot | 75/20 |
| 3,784,423 | 1/1974 | Kobetz et al. | 149/109 |
| 3,784,682 | 1/1974 | Niebylski et al. | 423/645 |
| 3,811,972 | 5/1974 | Niebylski et al. | 149/109 |
| 3,929,425 | 12/1975 | Valdo | 29/191 |

Primary Examiner—Wayne A. Langel
Attorney, Agent, or Firm—Paul R. Martin; L. E. Carnahan; William R. Moser

[57] ABSTRACT

Disclosed is a low density foam having a porosity of from 0 to 98% and a density less than about 0.67 gm/cc, prepared by heating a mixture of powered lithium hydride and beryllium hydride in an inert atmosphere at a temperature ranging from about 455 to about 490 K for a period of time sufficient to cause foaming of said mixture, and cooling the foam thus produced.

Also disclosed is the process of making the foam.

18 Claims, 5 Drawing Sheets

LOW DENSITY METAL HYDRIDE FOAMS

FIELD OF THE INVENTION

The present invention relates to low density, high porosity foams, and to their method of preparation. More specifically, it relates to low density, high porosity foams prepared from lithium and beryllium hydrides 1. Background of the Invention Low density, high porosity foams, particularly those having a low Z value, i.e., low atomic number elements, are suitable for use as X-ray scattering elements in devices such as the Thomson Scattering Polarimeter proposed for use in space exploration. The Thomson Scattering Polarimeter is described in an article by G. W. Frazer et al., "A Composite X-ray Polarimeter for XMM, Instrument Proposal in Response to ESA AO SCI (88)1, June 1988. Part 1: Scientific and Technical Plan," University of Leicester, Leicester, England (January 1989).

Suitable foams should be strong and machineable, and have low density, high porosity and low atomic number.

2. The Prior Art

U.S. Pat. Nos. 3,784,423 and 3,811,972 disclose a process for the preparation of a crystalline beryllium hydride containing composite of increased density which comprises heating an amorphous beryllium hydridecontaining composite at a temperature of 170°-230° C. wherein the composite contains from about 99.9 to 80 mole percent of beryllium hydride and from 0.1 to about 20 mole percent of lithium hydride. The density of the product is 0.75 gm/cc.

U.S. Pat. No. 3,784,682 discloses a process of increasing the density of metal hydrides, such as beryllium with the use of high temperature (65°-325° C.) and pressure in the presence of lithium hydride (Example 3). When beryllium hydride is subjected to this process, a material having a density of at least 0.69 gm/cc is obtained.

U.S. Pat. Nos. 2,983,597 and 3,929,426 disclose processes involving blowing molten metal with a suitable gas generating agent such as lithium hydride.

All of the above patents employ various aspects of lithium hydride and/or beryllium hydride processing, but they all attempt to achieve either a high density material or gas as a final product.

In contrast, the present invention is directed to a process which produces a low-density foam-like solid.

SUMMARY OF THE INVENTION

In one aspect the invention is a low density, highly porous metal hydride foam having a density ranging from about 0.013 to about 0.67 gm/cc, and a porosity of from 0 to 98%. The foam is derived from a mixture of beryllium hydride and lithium hydride powders.

Another aspect of the invention is the process or method of making the foam. The foam is made by preparing a mixture of lithium hydride and beryllium hydride powders, intimately working or grinding the mixture, heating it in an inert atmosphere to a temperature sufficient to cause foaming of the mixture, and subsequently cooling the product thus produced.

The foregoing and other aspects of the invention will be more readily understood by reference to the following description taken with the accompanying drawings in which:

FIG. 4 shows scanning electron micrographs of 97% total porosity $LiH-BeH_2$ foam.

FIG. 5 shows scanning electron micrographs of 78% total porosity $LiH-BeH_2$ foam.

FIG. 6 shows graphs depicting thermal analysis of foaming reaction with equimolar LiH and $BeH_2$.

DESCRIPTION OF PREFERRED EMBODIMENTS

Figure 1:
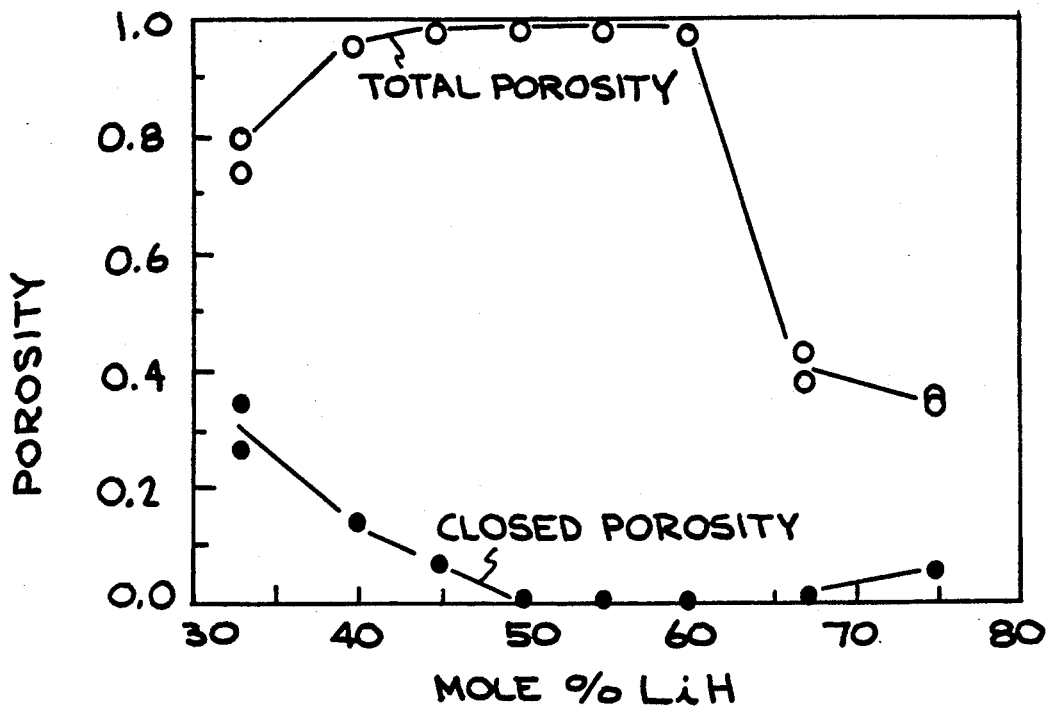
FIG. 1 is a graph showing the effect of composition on porosity of freely-expanded $LiH-BeH_2$ foam.

In carrying out the process of the invention, the first step is to obtain desired quantities of lithium hydride and beryllium hydride.

Lithium hydride powder can be obtained from the Martin-Marietta plant at Oak Ridge, Tennessee. It is typically 99.5 wt % LiH, with the major impurity being 0.3 wt % oxygen. It is polycrystalline. The powder is finely ground to a 2 μm particle size, as measured by nitrogen gas adsorption (BET) analysis.

Beryllium hydride powder was obtained from the Ethyl Corporation in Baton Rouge, Louisiana. It is amorphous, with a $BeH_2$ content of 90-96 wt %. Impurities in the $BeH_2$ include free Be metal (1-3 wt %), beryllium alkyls and alkoxides (2-3 wt %), beryllium chloride (0-.2%), and beryllium oxide and hydroxide (0-2%). It is also a fine powder, with a 4-10 μm mean particle size.

To make $LiH-BeH_2$ foam, the powdered reagents are first mixed and ground together. For small quantities (1-2 gram batches), it is preferred to use a Spex ball mill (model 8000) with a tungsten carbide mill and ball. For larger batches, i.e., up to 50 grams, it is preferred to use a Fritsch Pulverisette 5 planetary ball mill equipped with $5 \times 10^{-4}$ m$^3$ agate grinding bowls and agate balls. Grinding times are typically one-half to one hour. The resulting powder, which preferably has a mean particle size of about 1 μm, is then pressed in a compaction die made of high-strength steel (AISI 4140 or 4340, typically) with a uniaxial hydraulic press at 393 K and 140 MPa for 15 minutes (typically) to form a pellet. Alternatively, the ground powder can be subjected to the next step (heating) without being first compacted.

Thereafter the pellet is heated to 478 K at 3 K/minute (typically), held at 478 K for one hour, and cooled over 4 hours. Foaming begins as the pellet reaches 443-453 K and is essentially complete at 473 K. The one-hour soak at 478 K allows complete reaction and possibly some thermal annealing.

For free expansions, the pellet is heated in a chamber large enough to allow complete expansion of the foam without it touching the chamber. For restricted expansions (to make lower-porosity parts) a chamber is made from a stainless-steel ring of the desired inner diameter and height, with end closures of 0.5 mm thick stainless steel plates. This chamber is surrounded by an aluminum heat transfer block and electric heaters. Pressure is applied to the end plates, using the uniaxial hydraulic press, to seal the chamber.

It has been found that the method of grinding and mixing the reagents is crucial to success. Three methods of grinding and mixing were evaluated: 1) grinding by hand for 15 minutes in a boron carbide mortar and pestle; 2) grinding 50 gram batches in the Fritsch Pulverisette 5 mill for 1 hour; and 3) grinding 2 gram batches in the Spex-mill for 1 hour. With all three methods the mixture mean particle size (by BET analysis) was 1 μm, but the foaming reactions were quite different.

With material prepared in the mortar and pestle, the foaming reaction was incomplete as shown by low porosity and non-uniformity of the product. Fritsch-milled reagents reacted to give a higher porosity, uniform foam. Spex-milled powders gave the highest porosity foams. The effect of grinding clearly extends beyond particle size reduction. It is speculated that a thin layer of non-reactive oxides is removed and the powder is hence "activated" during extended grinding.

The foams of the invention can be obtained using either the Fritsch or Spex mills for grinding purposes.

The porosity (and therefore density) of the LiH-BeH$_2$ foam can be controlled either by variation of the initial stoichiometry, or by expansion of the foam into a confining volume. The effect of composition is shown in FIG. 1 for foams from pellets with 10 mm diameter, 5 mm length. It is seen that equimolar mixtures give the highest porosity, with a sharp dropoff as the composition deviates from equimolar.

Most of the tests were done with the equimolar composition, since the composition gave the highest porosity and hence, presumably the most complete reaction. To produce foams with density less than 95%, an equimolar pellet was heated and expanded in a confining chamber which restricted the expansion. In this way foams were made with porosity as low as 28%.

Foam porosity and density are related by $$P_{total} = 1 - P_{bulk}/P_{skeletal} \qquad (1)$$

where:

$P_{bulk}$ = bulk density of foam, kg/m$_3$;

$P_{skeletal}$ = density of fully dense LiH-BeH$_2$, kg/m$^3$;

$P_{total}$ = total porosity, or fraction of volume occupied by pores.

The skeletal density is estimated from:

$$P_{skeletal} = 700\, X_{LiH} + 640\, X_{BeH2g} \qquad (2)$$

where:

$X_{LiH}$, $X_{BeH2}$ = mole fractions in the mixture;

density of $^6$LiH = 700 kg/m$^3$;

density of amorphous BeH$_2$ = 640 kg/m$^3$.

From Eq. (2), the skeletal density of equimolar LiH-BeH$_2$ is 670 kg/m$^3$. The density of equimolar LiH-BeH$_2$ foam that has been thoroughly pulverized (to open an closed pores) is 696 kg/m$^3$, in reasonable agreement with Eq. (2).

Some portion of the total foam porosity is present as closed pores which are not accessible to intruding fluids. The extent of closed porosity can be determined by air compression pycnometry or mercury porosimetry, both pore-intrusion porosity measurement methods.

Air compression pycnometry is carried out in a Quantachrome MPY-1 Micropycnometer. In this instrument, a pressurized known reference volume (reference volume = 8×10$^{-6}$ m$^3$, initial pressure = 150–200 kPa argon or helium) is connected to a sample volume containing the foam sample (sample volume when empty = 8×10$^{-6}$ m$^3$, initial pressure = 100 kPa). From the equilibrium pressure, the solid volume of the sample is calculated.

Mercury porosimetry measurements are made using an Autopore 9210 operating between 9.4 kPa and 412 MPa; this allows detection of pores ranging in diameter from 3 nm to 130 μm. Mercury porosimetry data gives total pore area and volume, pore size distribution, bulk density, and apparent skeletal density.

The closed porosity can be calculated using:

$$P_{closed} = P_{bulk}(1/P_{skeletal,\ measured} - 1/P_{skeletal}) \qquad (3)$$

where:

$P_{closed}$ = closed porosity (fraction of volume occupied by closed pores);

$P_{skeletal,\ measured}$ = skeletal density from pore-intrusion method.

Figure 2:
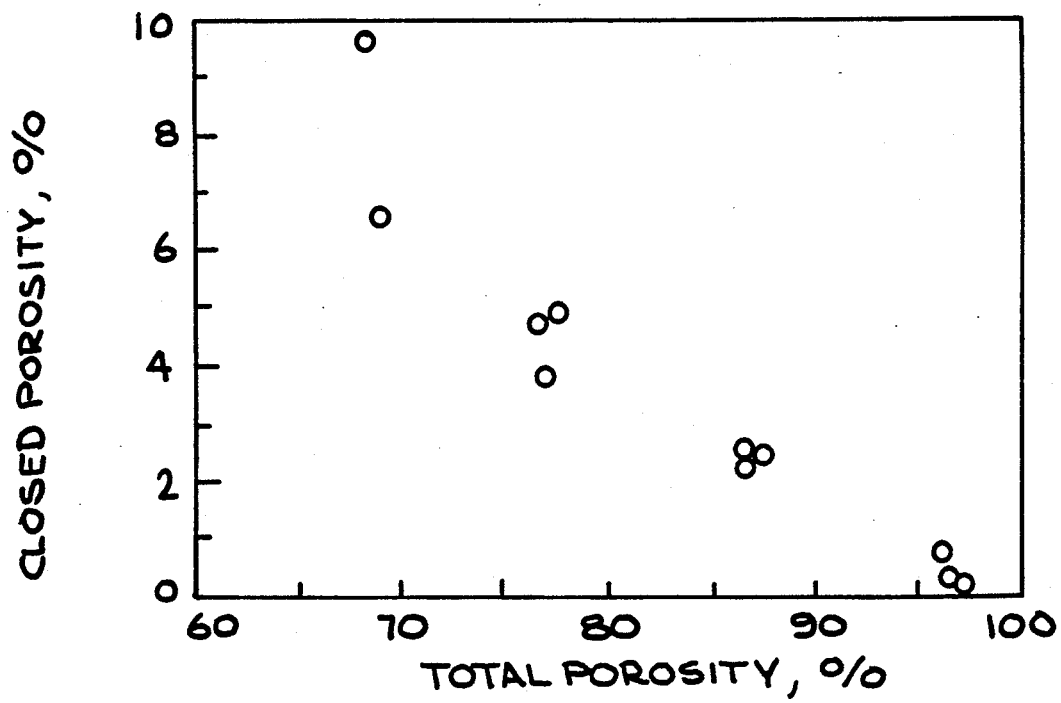
FIG. 2 is a graph showing the dependence of foam closed porosity on total porosity.

FIG. 2 contains data for equimolar foams of different total porosities. The foams were typically 10 to 20 mm in diameter and length. At lower porosities a significant fraction of the total porosity is closed, while at porosities above 70% the porosity is virtually all open.

Figure 3A:
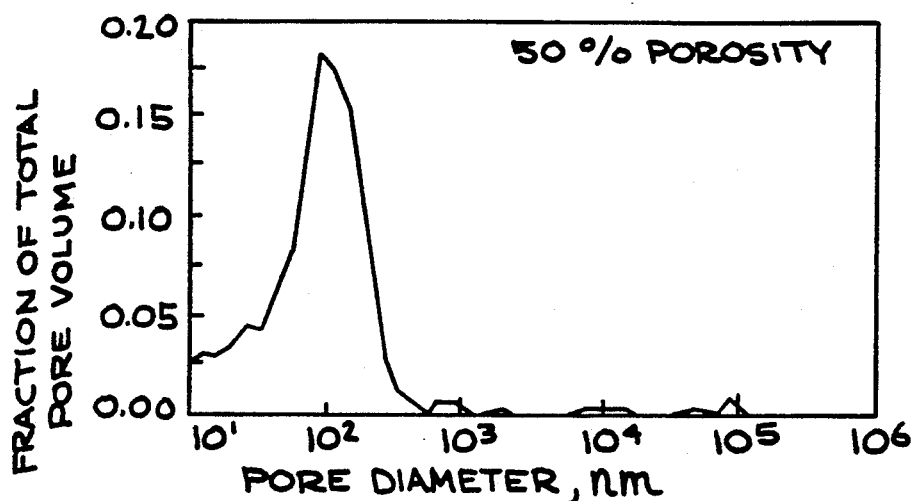
FIG. 3 is a series of graphs illustrating pore size distribution for foams with different porosities, as measured by mercury porosimetry.
Figure 3B:
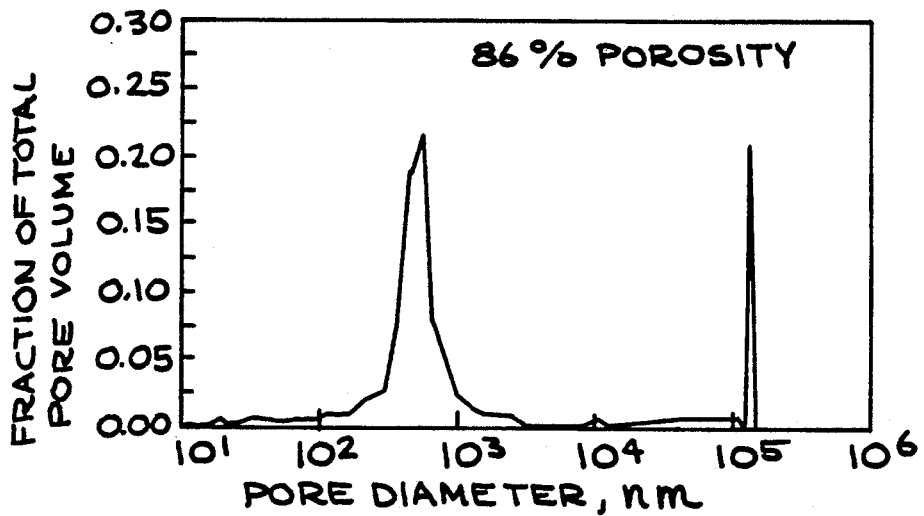
Figure 3C:
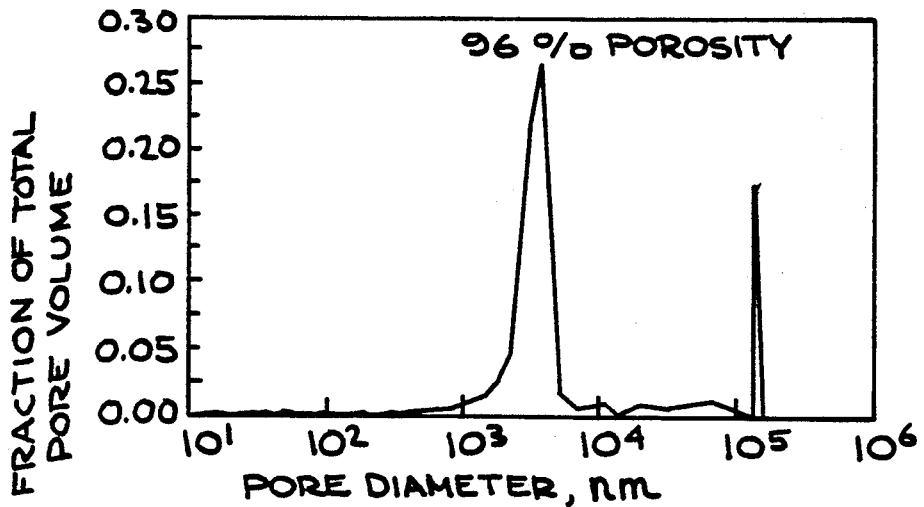

The pore size distribution was determined using mercury porosimetry for foams with 50%, 86%, and 96% total porosities; the results are shown in FIG. 3. The porosity of these foam parts were controlled by expansion into a confined space, about 20 mm in diameter and 10 mm in length. With a foam of 50% porosity, the pore size is centered on 100 nm, comparable with pore size in other low density foams (e.g. silica aerogel with 300 nm pores). As porosity increases, the pore size distribution shifts upward as well. At the higher porosities, there are many pores too big to be detected by mercury porosimetery (>130 μm), since they are filled at the starting pressure of the porosimeter. The fraction of these can be calculated from the porosimetry data and the true crystal density, and is shown in FIG. 3 for the 86% and 96% porosity foams.

Scanning electron photomicrographs of 97% and 78% porosity foams are shown in FIGS. 4 and 5. In FIG. 4, the presence of large pores (130 microns) in the high porosity foam is clearly visible. The top view is 20X magnification, and the bottom view is 100 X. The pores are not present in the more dense material in FIG. 5. In FIG. 5 the top view is 20 X magnification, and the bottom view is 1,000 X. The greatly reduced pore size at lower porosity is obvious from a comparison of the high magnification view in FIGS. 4 and 5. The magnification in FIG. 5 is 10 times that of FIG. 4.

To assess foam uniformity, radiography with 10–18 KeV X-rays was used. Exposure time and film selection depended on the density of the foam being examined. Data from digitized images were used to calculate the foam density at many points within the foam, based on absorbance values and sample thickness. From this, the uniformity of foam density was easily calculated. With equimolar foams of 80% porosity in the form of 50 mm diameter, 25 mm long discs, maximum density variations within the best foams were less than ±10%.

The LiH-BeH$_2$ foam is a gray rigid material. It is physically robust, such that even foams with 95% porosity can be easily handled, and is readily machined in a standard lathe. The compressive strength is sufficient, even for 97% porous foam, to allow it to be held in a standard three-jaw lathe chuck.

LiH-BeH$_2$ foams are moisture sensitive, and are preferably handled in a glove box with a dry inert atmosphere. In the presence of moisture, the components form Be(OH)$_2$ and Li$_2$CO$_3$ (identified by X-ray crystallography). By measuring the mass increase of a foam sample while it was exposed to air with constant moisture level, the occurence of the hydrolysis reaction was monitored. The hydrolysis reaction is slow in moist air, and negligible in dry air. The foam can be handled in moist air for a few minutes and in dry air for many hours without significant degradation.

The LiH-BeH$_2$ foam is typically about 95 wt % pure. The major impurities are beryllium metal (1-3 wt %), and carbon and oxygen (1-2 wt % each).

The LiH-BeH$_2$ foam at 473 K is fluid with very low viscosity; it readily passes through a 5 um stainless steel frit under only the force of gravity.

The following observations of the foaming reaction have been made:
1. Weight loss during foaming is 0.5-1%.
2. The gas released during foaming is primarily hydrogen, with a minor component (a few percent) corresponding to C$_2$H$_6$.
3. The foaming reaction is most vigorous with near-equimolar mixture of LiH and BeH$_2$.
4. In visual observation of a pellet during foaming, bubbles were observed being blown out of the expanding mass, which was clearly plastic or fluid. With the pellet heated at the bottom, foaming proceeded from bottom to top.

The stoichiometry of the foam closely matches that of the initial mixture since the weight change upon foaming is low. The weight loss reflects the gas evolution that provides the force needed to blow the plastic mixture into a foam. It is expected that more organics are released during foaming than were seen in the mass spectrometer; certainly enough must be released to provide the skin of the bubbles observed during foaming. The observation that the most vigorous foaming reaction occurs with equimolar mixtures of LiH and BeH$_2$ suggests that the compound LiBeH$_3$ may be involved as an intermediate or final product. The reported 55% LiH/45% BeH$_2$ mixture, which foams to the highest porosity as shown in FIG. 1, may actually be equimolar LiH and BeH$_2$, with the error being the result of unknown impurities in the BeH$_2$. The impurity content of the BeH$_2$ is taken into account in formulating the mixtures.

The foaming reaction is endothermic, as shown by differential thermal analysis. Simultaneous differential thermal analysis and thermogravimetric analysis is carried out using a Stanton Redcroft STA 780 Thermal Analysis System. This instrument provides controlled heating and cooling ramps from 298 to 1273 K. Mass data (balance with 0-20 mg or 0-200 mg measurement range, 5 gram maximum sample size), and differential thermal data (5 mK sensitivity with a platinum-rhodium thermocouple) is taken simultaneously from samples (1-10 mg typical weight for LiH-BeH$_2$) The data is recorded and analyzed using a Hewlett Packard 87 XM computer and a Hewlett Packard 3496 datalogger, with software developed by the inventors.

In FIG. 6 are two thermal cycles of equimolar LiH-BeH$_2$ to 230° C. (500 K). In the first cycle (part a), the foaming reaction is seen in the heating cycle as the double-peaked endotherm starting at 423 K and ending at 470 K. In the first cooling cycle, two exotherms are present that are believed to be phase changes of the foam which may be LiBeH$_3$. In the second thermal cycle, the reaction endotherm in the heating cycle is not present, since the reaction went to completion in the first cycle, and instead there is a single endotherm that is believed to be the phase change of the foam from solid to fluid. The cooling curve for the second thermal cycle is the same as for the first cycle.

It should be noted that the start of the phasechange endotherm in the second heating cycle is at the same temperature as the major exotherm in the cooling cycle, confirming that these peaks are reversible phase changes, probably solid-liquid. There was no mass loss during six thermal cycles of this sample, which is indicative of a stable compound that is undergoing phase change.

The Thomson Scattering Polarimeter (TSP) is part of a Composite X-ray Polarimeter proposed for inclusion in the High Throughput X-ray Spectroscopy Space Mission, XMM, which is sponsored by the European Scientific Agency. The TSP utilizes the angular dependence, in a low-Z material, of the scattering cross-section for linearly-polarized X-rays to provide a spectrally-sensitive measurement of polarization of 4-16 keV X-rays from sources of astrophysical interest such as active galaxies, black holes, pulsars, accretion discs, and Supernova remnants. Lithium metal is the baseline material for the scattering element, but the low density and low atomic number of the LiH-BeH$_2$ foam offer potential advantages in performance.

The lithium hydride and beryllium hydride foam has a unique combination of low density, high porosity, low atomic number, and robust physical properties. The pores are mostly open for high-porosity foams, with a higher fraction being closed at lower porosities. Pore size depends on the total foam porosity. The foam is reactive to moisture in air, but not with dry air. The mechanism of the foaming process is not fully understood, but during the endothermic reaction, gas is evolved to expand the plastic reaction mass into a foam. Because equimolar mixtures foam most vigorously, it appears that the compound LiBeH$_3$ may be involved as an intermediate or final reaction product.

In carrying out the process of this invention, the LiH and BeH$_2$ powders are preferably mixed in molar ratios ranging from about 1:3 to about 19:1, more preferably from about 2:3 to about 3:2, and most preferably 1:1.

The mixture of powders is preferably ground to a mean particle size ranging from about 0.1 to 20 microns, more preferably about 0.5 to 10 microns, and most preferably about 1 micron.

The mixture of LiH and BeH$_2$ powders are preferably ground in a Spex ball mill, (model 8000).

After grinding, the mixture is preferably compacted into a pellet, then preferably heated to a temperature ranging from about 455 to about 490 K, more preferably about 466 to about 484 K, and most preferably 478 K.

Alternatively, the mixture can be left as a powder and subjected to the heating step.

The density of the foam preferably ranges from about 0.013 to about 0.67 gm/cc, more preferably from about 0.40 to about 0.07 gm/cc, and most preferably about 0.13 gm/cc.

The porosity preferably ranges from about 0 to about 98%, more preferably from about 40 to about 90%, and most preferably about 80%.

As previously mentioned, the density and porosity can be adjusted by expanding the compacted powders in a confined space.

This invention will be more fully understood by reference to the following examples. The examples are intended to be illustrative of the invention, but not limiting thereof.

EXAMPLE 1

19.4 grams of $^6$LiH and 30.6 grams of BeH$_2$ (50 mole % $^6$LiH, 50 mole % BeH$_2$) were mixed and ground in a Fritsch ball mill for 15 minutes. With material from three such batches, 122 grams of powder was pressed into a disc of 10 cm diameter and 2.5 cm height by compaction at 68 MPa for 15 minutes at 393 K, followed by 68 MPa for 2 hours at 383 K. This disc was held in a stainless steel chamber with inner diameter of 15.2 cm and height of 5.1 cm, and was heated from 293 K to 478 K in 60 minutes. It was held at 478 K for 60 minutes, and then cooled to 303 K in 4 hours. The product foam was a disc with diameter of 15.2 cm and height of 5.1 cm, with density of 0.13 g/cc and porosity of 81%.

EXAMPLE 2

19.4 grams of $^6$LiH and 30.6 grams of BeH$_2$ (50 mole % $^6$LiH, 50 mole % BeH$_2$) were mixed and ground in a Fritsch ball mill for 60 minutes. From this batch, 7.13 grams of powder was pressed into a disc of 3.8 cm diameter and 1.0 cm height by compaction at 1.5 MPa for 60 minutes at 298 K. This disc was held in a stainless steel chamber with inner diameter of 5.1 cm and height of 2.5 cm, and was heated from 293 K to 478 K in 60 minutes. It was then cooled to 293 K in about 1 hour. The product foam was a disc with diameter of 5.1 cm and height of 2.5 cm, with density of 0.14 g/cc and porosity of 79%.

EXAMPLE 3

0.382 grams of $^6$LiH and 0.618 grams of BeH$_2$ (50 mole % $^6$LiH, 50 mole % BeH$_2$) were mixed and ground in a Spex ball mill for 30 minutes. From this powder, 152 mg was taken and pressed into a disc of 9.5 mm diameter and 3.3 mm height by compaction at 336 MPa for 60 minutes at 383 K. This disc was heated from 293 K to 478 K in 60 minutes; it was allowed to expand without constraint during the heat-up and remainder of the thermal cycle. It was held at 478 K for 60 minutes, and then cooled to 293 K in about 2 hours. The product foam was a slightly irregular disc with diameter of 26 mm and height of 21 mm, with density of 0.013 g/cc and porosity of 98%.

EXAMPLE 4

0.236 grams of $^6$LiH and 0.764 grams of BeH$_2$ (33 mole % $^6$LiH, 67 mole % BeH$_2$) were mixed and ground in a Spex ball mill for 30 minutes. From this powder, 152 mg was taken and pressed into a disc of 9.5 mm diameter and 3.5 mm height by compaction at 336 MPa for 60 minutes at 383 K. This disc was heated from 293 K to 478 K in 60 minutes; it was allowed to expand without constraint during the heat-up and remainder of the thermal cycle. It was held at 478 K for 60 minutes, and then cooled to 293 K in about 2 hours. The product foam was a slightly irregular disc with diameter of 13 mm and height of 5.9 mm, with density of 0.18 g/cc and porosity of 73%.

EXAMPLE 5

0.649 grams of $^6$LiH and 0.350 grams of BeH$_2$ (75 mole % $^6$LiH, 25 mole % BeH$_2$) were mixed and ground in a Spex ball mill for 30 minutes. From this powder, 152 mg was taken and pressed into a disc of 9.5 mm diameter and 3.1 mm height by compaction at 336 MPa for 60 minutes at 383 K. This disc was heated from 293 K to 478 K in 60 minutes; it was allowed to expand without constraint during the heat-up and remainder of the thermal cycle. It was held at 478 K for 60 minutes, and then cooled to 293 K in about 2 hours. The product foam was a disc with diameter of 9.9 mm and height of 4.0 mm, with density of 0.49 g/cc and porosity of 28%.

EXAMPLE 6

19 4 grams of $^6$LiH and 30.6 grams of BeH$_2$ (50 mole % $^6$LiH, 50 mole % BeH$_2$) were mixed and ground in a Fritsch ball mill for 60 minutes. From this powder, 2.3 g was taken, held in a stainless steel chamber with inner diameter of 5.1 cm and height of 2.5 cm, and heated from 293 K to 478 K in 3 hours. It was held at 478 K for 3 hours, and then cooled to 293 K in about 1 hour. The product foam was a disc with diameter of 5.1 cm and height of 2.5 cm, with density of 0.13 g/cc and porosity of 91%

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention in various embodiments and with various modifications, as are suited to the particular use contemplated. It is intended that the scope of the invention be defined by the claims appended hereto.

We claim:

1. A low density lithium hydride-beryllium hydride foam having a porosity of from 0 to 98% and a density less than about 0.67 gm/cc, prepared by heating a mixture of powdered lithium hydride and beryllium hydride in an inert atmosphere at a temperature ranging from about 455 to about 490 K for a period of time sufficient to cause foaming of said mixture, and cooling the foam thus produced.

2. The low density foam of claim 1 wherein said mixture comprises a 50—50 mole percent of lithium hydride and beryllium hydride.

3. The low density foam of claim 1 wherein the density ranges from about 0.013 to less than about 0.67 gm/cc.

4. The low density foam of claim 3 wherein the density is 0.13 gm/cc.

5. A porous foam having a density less than about 0.67 gm/cc comprising an expanded mixture of lithium hydride and beryllium hydride.

6. A method of making a low density, porous foam comprising the steps of:

(a) preparing a mixture of powdered lithium hydride and beryllium hydride,
(b) grinding said mixture,
(c) heating said mixture in an inert atmosphere to a temperature ranging from about 455 to about 490 K for a period of time sufficient to cause foaming thereof, and
(d) cooling the product thus formed.

7. The method of claim 6 wherein said mixture is molded or pressed prior to heating.

8. The method of claim 6 wherein said mixture comprises a 50—50 mole percent of lithium hydride and beryllium hydride.

9. The method of claim 6 wherein said mixture is heated to a temperature between 466 to 484 K.

10. The method of claim 6 wherein said inert atmosphere is selected from the group consisting of argon, helium and nitrogen.

11. The method of claim 6 wherein the density of said foam is controlled by expanding said mixture in a confined space.

12. The method of claim 11 wherein the density ranges from about 0.013 to less than about 0.67 gm/cc.

13. The method of claim 6 wherein said mixture is ground for a period of time sufficient to achieve a particle size of from about 0.1 to about 20 microns.

14. The method of claim 13 wherein said mixture is ground for a period of time sufficient to activate it.

15. The method of claim 6 wherein the lithium hydride and beryllium hydride powders are present in molar ratios ranging from about 1:3, to about 19:1.

16. The method of claim 6 wherein the lithium hydride and beryllium hydride powders are ground to a mean particle size ranging from about 0.5 to about 10 microns.

17. The method of claim 6 wherein the ground powders are heated to a temperature of 478 K.

18. A low density foam having a porosity of about 81%, and a density of about 0.13 gm/cc, prepared by heating a compacted pellet of a 1:1 mole ratio of lithium hydride and beryllium hydride powder having a mean particle size of 1 micron, to a temperature of at least 478 K, for a period of time sufficient to cause foaming of said pellet, maintaining said foam at said temperature for a period of time sufficient to anneal it, and cooling said foam.

* * * * *